(12) United States Patent
Li et al.

(10) Patent No.: US 10,575,301 B2
(45) Date of Patent: Feb. 25, 2020

(54) ACQUISITION METHOD FOR DATA IN WIRELESS BODY AREA NETWORK AND CENTRAL DEVICE

(71) Applicant: ZTE CORPORATION, Shenzhen, Guangdong Province (CN)

(72) Inventors: Ming Li, Shenzhen (CN); Yang Guo, Shenzhen (CN); Jing Liu, Shenzhen (CN); Xinbing Wang, Shenzhen (CN); Bin Yuan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 502 days.

(21) Appl. No.: 15/306,308

(22) PCT Filed: Aug. 27, 2014

(86) PCT No.: PCT/CN2014/085345
§ 371 (c)(1),
(2) Date: Oct. 24, 2016

(87) PCT Pub. No.: WO2015/161602
PCT Pub. Date: Oct. 29, 2015

(65) Prior Publication Data
US 2017/0048852 A1 Feb. 16, 2017

(30) Foreign Application Priority Data

Apr. 25, 2014 (CN) .......................... 2014 1 0172404

(51) Int. Cl.
*H04W 56/00* (2009.01)
*H04W 72/04* (2009.01)
(Continued)

(52) U.S. Cl.
CPC ...... *H04W 72/0446* (2013.01); *H04B 13/005* (2013.01); *H04W 72/0406* (2013.01);
(Continued)

(58) Field of Classification Search
CPC ............. H04W 72/0446; H04W 52/02; H04W 72/0406; H04W 72/087; H04W 74/0816;
(Continued)

(56) References Cited

U.S. PATENT DOCUMENTS

| | | | |
|---|---|---|---|
| 2009/0238160 A1 | 9/2009 | Bhatti et al. | |
| 2010/0278156 A1 | 11/2010 | Shin et al. | |
| 2012/0155279 A1* | 6/2012 | Ho | H04L 47/522 370/241 |

FOREIGN PATENT DOCUMENTS

| CN | 102340838 A | 2/2012 |
|---|---|---|
| CN | 102474359 A | 5/2012 |

OTHER PUBLICATIONS

IEEE Computer Society; IEEE Standard for Local and metropolitan area networks—Part 15.6: Wireless Body Area Networks (IEEE Std 802.15.6-2012); Feb. 29, 2012; IEEE Standard Association; pp. 3-5, 88-89, and Fig. 64 (Year: 2012).*

(Continued)

*Primary Examiner* — Brandon M Renner
(74) *Attorney, Agent, or Firm* — Cantor Colburn LLP

(57) ABSTRACT

An acquisition method for data in a wireless body area network and a central device, the acquisition method includes: a central device acquiring topology structure information of a network formed by node devices, and according to the topology structure information of the network determining time slot information about a super-frame; after time slot information is published, acquiring service data packets of an Exclusive Access Phase EAP, a Random Access Phase called RAP and a managed access MAP1 phase in sequence; acquiring packet loss information in the MAP1 phase, and allocating time slots of a managed access MAP2 phase according to the packet loss information; and after the allocated time slots are published, acquiring service data packets in the MAP2 phase according to the allocated time
(Continued)

slots. The technical solution can realize the reliable transmission of data in a wireless body area network and reduce the power consumption and time delay.

16 Claims, 4 Drawing Sheets

(51) Int. Cl.
 H04B 13/00 (2006.01)
 H04W 72/08 (2009.01)
 H04W 74/08 (2009.01)
(52) U.S. Cl.
 CPC ..... *H04W 72/087* (2013.01); *H04W 74/0816* (2013.01); *Y02D 70/00* (2018.01)
(58) Field of Classification Search
 CPC ........ H04B 13/005; H04L 1/08; Y02D 70/00; Y02B 60/50
 See application file for complete search history.

(56) References Cited

OTHER PUBLICATIONS

European Search Report dated Mar. 10, 2017 for EP Application No. 14889826.5.
Hyeopgeon Lee et al: "A GTS Allocation Scheme for Emergency Data Transmission in Cluster-tree WSNs", Advanced Communication Technology (ICACT), 2012 14th International Converence on, IEEE, Feb. 19, 2012.
International Search Report and Written Opinion dated Jan. 28, 2015 in PCT Application No. PCT/CN2014/085345.

* cited by examiner

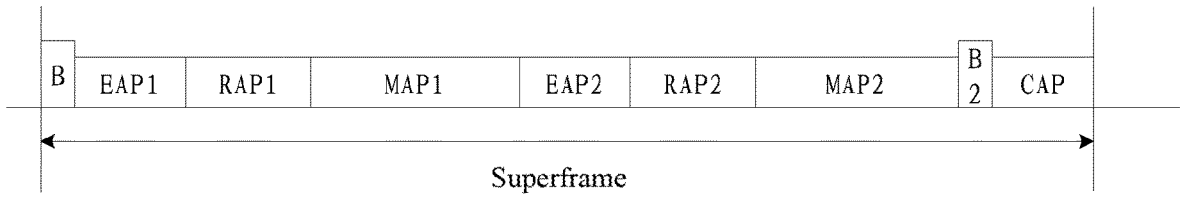
FIG. 1
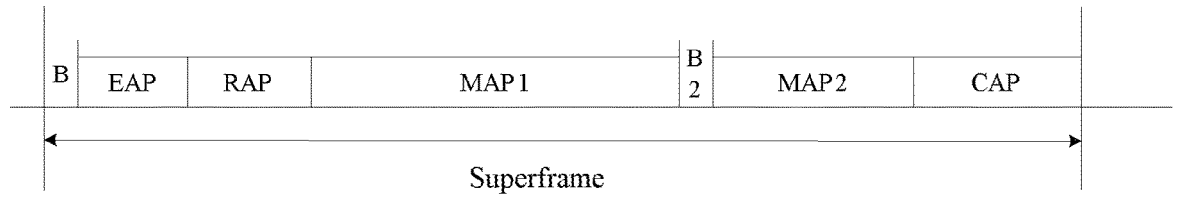
FIG. 2
FIG. 3

ACQUISITION METHOD FOR DATA IN WIRELESS BODY AREA NETWORK AND CENTRAL DEVICE

CROSS-REFERENCE TO RELATED APPLICATION(S)

This application is the U.S. National Phase application of PCT application number PCT/CN2014/085345 having a PCT filing date of Aug. 27, 2014, which claims priority of Chinese patent application 201410172404.9 filed on Apr. 25, 2014, the disclosures of which are hereby incorporated by reference.

TECHNICAL FIELD

The present document relates to technical field of a wireless body area network, and in particular, to an acquisition method for data in a wireless body area network and a central device.

BACKGROUND OF RELATED ART

A Body Area Network, called BAN is a network attached to the human body, which is composed of a set of small and movable sensors with communication function and a body master station (central device). Each sensor can be worn on the body or implanted inside the body. A wireless body area network is a short-range wireless communication network applied on body surface or inside the body, and is mainly used for the monitoring of biological signs information and other wireless applications. The wireless body area network is composed of various medical sensor nodes and a hub node all over the outside and the inside of the body. The sensor may be, for example, an electrocardiogram sensor, a heart rate sensor, a blood pressure sensor or a temperature sensor, etc.

The hub node is responsible for collecting physiological data acquired by sensor nodes, which are used for physical examination and an analysis and prediction of the disease, etc. This medical application based on the wireless body area network greatly facilitates users and hospitals and saves medical costs at the same time. In addition to typical medical applications, the wireless body area network may also be used for monitoring physiological parameters of an athlete so that the athlete can carry out effective training according to the corresponding parameters; the wireless body area network may also be used in military to know about the physical status of soldiers on the battlefield in time. The IEEE has published a first standard for the WBAN (IEEE 802.15.6) in March, 2012.

The sensors for medical applications are usually attached on the body surface or implanted into the body, and since the human body comfort and the difficulty of the implantation into the body are considered, this type of sensors are all miniaturized, thus the battery capacity for a sensor is limited. Some sensors might be required to work for a few years or even decades, and it is a severe challenge how to reduce power consumption and prolong service life of a sensor node as much as possible. In addition, when a sensor sends data packets to the hub node, the wireless link becomes unstable due to the particularity of human body environment and human movement characteristics, and it is another problem faced by the wireless body area network technology how to reliably transmit data is another problem.

Further, Media Access Control, called MAC layer controls when various sensor nodes access the channel and perform a receiving/sending data packets operation, thus MAC layer also relates to the power consumption and data transmission of a wireless body area network. In view of this, low power consumption, low latency and reliable transmission become an urgent problem to be solved in wireless body area network applications.

In related arts, a super-frame structure based on a Beacon mode is given in IEEE 802.15.6 standard protocol, as shown in FIG. 1. The frame begins with a Beacon and is composed of: an Exclusive Access Phase 1 called EAP1, a Random Access Phase 1 called RAP1, a Managed Access Phase 1 called MAP1, an EAP2, a RAP2, an MAP2, a Beacon 2 and a Contention Access Phase called CAP, herein:

The EAP is a phase specially used for emergency service packets transmission, and adopts CSMA/CA or time slot ALOHA which is a competitive mechanism. The RAP and CAP are phases used for ordinary service packets transmission, and adopt CSMA/CA or Slotted ALOHA which is a competitive mechanism. The MAP is a phase used for emergency service/ordinary service transmission, and adopts access modes based on the "Scheduling" and the "Polling". If a CAP phase needs to be used, the hub node will notify sensor nodes through the Beacon2, called B2.

In the IEEE 802.15.6, conflicts can be avoided in the transmission process since the MAP phase is operated by the ways of "Scheduling" and "Polling", but the disadvantage is that: the MAP requires that the hub node and the sensor node carry out a series of "query-response" and this process brings additional interactive energy consumption. There are two parts of MAP phase in the standard protocol, and since the MAP phase is carried out by the way of "Polling", the communication module of each sensor node has to be opened so that the hub node polls to the communication module of each sensor node, which can bring additional power consumption, and the time delay for data transmission is longer.

The above is merely used to help to understand the technical solution of the present document and does not mean to admit that the above is the existing art.

SUMMARY

The main object of the present document is to provide an acquisition method for data in a wireless body area network and a central device, which intend to realize the reliable transmission of data in the wireless body area network and reduce the power consumption and time delay.

To achieve this, adopt the technical solution as follows:

an acquisition method for data in a wireless body area network, including:

a central device acquiring topology structure information of a network formed by node devices, and according to the topology structure information of the network, determining time slot information about a superframe that corresponds to the topology structure information of the network and allocating the node device to which each time slot of a first Managed Access Phase called MAP1 belongs;

after broadcasting the time slot information, the central device acquiring service data packets of an Exclusive Access Phase called EAP, a Random Access Phase called RAP and the MAP1 phase in sequence;

the central device acquiring packet loss information of each node device in the MAP1 phase, and allocating time slots of a second Managed Access Phase called MAP2 to all the node devices in which packets were lost in the MAP1 phase according to the packet loss information;

after broadcasting the allocated time slots of the MAP2 phase, the central device acquiring service data packets in the MAP2 phase.

Alternatively, the steps of a central device acquiring topology structure information of a network formed by node devices, and according to the topology structure information of the network, determining time slot information about a superframe that corresponds to the topology structure information of the network include:

acquiring types of the node devices, data type acquired by the node devices and acquisition frequency;

determining the time slot information of the superframe according to the types of the node devices, the data type acquired by the node devices and the acquisition frequency.

Alternatively, the steps of determining the time slot information of the superframe according to the types of the node devices, the data type acquired by the node devices and the acquisition frequency include:

determining an overall time-slot length of the superframe, a time-slot length of the EAP phase, a time-slot length of the RAP phase and a time slot length of the MAP1 phase according to the types of the node devices, the data type acquired by the node devices and the acquisition frequency.

Alternatively, the steps of acquiring packet loss information in the MAP1 phase, and allocating time slots of the MAP2 phase according to the packet loss information include:

confirming whether packet loss occurs in each node device through the time slot which is allocated to each node device and the data packets which are actually received by the central device in the MAP1 phase;

allocating time slots of the MAP2 phase to all the node devices in which the packet loss occurs in the MAP1 phase.

Alternatively, the method further includes:

after entering a Contention Access Phase called CAP, the central device establishing a network connection with a node device applying for joining and/or disconnecting a network connection with a node device applying for sleeping.

Alternatively, in the step of the central device broadcasting the time slot information, the central device broadcasts the time slot information by a first Beacon in order to notify each node device of the time slot information.

Alternatively, in the step of the central device broadcasting the allocated time slots of the MAP2 phase, the central device broadcasting the time slots of the MAP2 phase to the node devices by a second Beacon2 in order to notify the node devices in which packet loss occurs in the MAP1 phase of the time slots of the MAP2 phase.

Alternatively, the central device receives emergency service data packets by using Carrier Sense Multiple Access with Collision Avoidance, called CSMA/CA access mode in the EAP phase, and receives ordinary service data packets by using the CSMA/CA access mode in the RAP phase, and receives emergency and/or ordinary service data packets by using Scheduling mode in the MAP1 phase and the MAP2 phase.

Alternatively, the method further including:

after the central device acquiring service data packets in the MAP2 phase, acquiring service data packets in a Contention Access Phase called CAP.

Alternatively, said acquiring service data packets in a Contention Access Phase called CAP includes:

receiving emergency and/or ordinary service data packets by using Carrier Sense Multiple Access with Collision Avoidance, called CSMA/CA access mode in the CAP phase.

A central device for data in a wireless body area network, including a determining module, a first acquiring module, an allocating module and a second acquiring module, herein:

the determining module is configured to acquire topology structure information of a network formed by node devices, and according to the topology structure information of the network, determine time slot information about a superframe and allocate the node device to which each time slot of the MAP1 phase belongs;

the first acquiring module is configured to acquire service data packets of an Exclusive Access Phase called EAP, a Random Access Phase called RAP and a first Managed Access Phase called MAP1 in sequence after the time slot information is broadcast;

the allocating module is configured to acquire packet loss information of each node device in the MAP1 phase, and allocate time slots of a second Managed Access Phase called MAP2 to all the node devices in which packets were lost in the MAP1 phase;

the second acquiring module is configured to acquire service data packets in the MAP2 phase after the allocated time slots of the MAP2 phase are broadcast.

Alternatively, the determining module includes an acquiring unit and a determining unit, herein:

the acquiring unit is configured to acquire types of the node devices, data type acquired by the node devices and acquisition frequency;

the determining unit is configured to determine the time slot information of the superframe according to the types of the node devices, the data type acquired by the node devices and the acquisition frequency.

Alternatively, the determining unit is configured to determine the time slot information of the superframe according to the types of the node devices, the data type acquired by the node devices and the acquisition frequency according to the following:

determining an overall time-slot length of the superframe, a time-slot length of the EAP phase, a time-slot length of the RAP phase and a time slot length of the MAP1 phase according to the types of the node devices, the data type acquired by the node devices and the acquisition frequency.

Alternatively, the allocating module includes a confirming unit and an allocating unit, herein:

the confirming unit is configured to confirm whether packet loss occurs in each node device through the time slot which is allocated to each node device and the data packets which are actually received by the central device in the MAP1 phase;

the allocating unit is configured to allocate time slots of the MAP2 phase to all the node devices in which the packets were lost in the MAP1 phase.

Alternatively, the central device further includes a network management module, herein:

the network management module is configured to establish a network connection with a node device applying for joining and/or disconnect a network connection with a node device applying for sleeping after entering a Contention Access Phase called CAP.

Alternatively, the first acquiring module is configured to broadcast the time slot information by a first Beacon in order to notify each node device of the time slot information.

Alternatively, the second acquiring module is configured to broadcast the time slots of the MAP2 phase to node devices by a second Beacon2 in order to notify the node devices in which packet loss occurs in the MAP1 phase of the time slots of the MAP2 phase.

Alternatively, the first acquiring module is configured to receive emergency service data packets by using Carrier Sense Multiple Access with Collision Avoidance, called CSMA/CA access mode in the EAP phase, and receive ordinary service data packets by using the CSMA/CA access mode in the RAP phase, and receive emergency and/or ordinary service data packets by using Scheduling mode in the MAP1 phase;

the second acquiring module is configured to receive emergency and/or ordinary service data packets by using Scheduling mode in the MAP2 phase.

Alternatively, the second acquiring module is further configured to acquire service data packets in a Contention Access Phase called CAP after acquiring service data packets in the MAP2 phase.

Alternatively, the second acquiring module is configured to receive emergency and/or ordinary service data packets by using Carrier Sense Multiple Access with Collision Avoidance, called CSMA/CA access mode in the CAP phase.

In the acquisition method for data in a wireless body area network and a central device of the above technical solution, in the process of receiving service data packets by the central device, a superframe begins with a Beacon and is composed of an EAP phase, a RAP phase, an MAP1 phase, a Beacon 2, an MAP2 phase and a CAP phase. Herein, the EAP phase is used for a random contention access of an emergency service, the RAP phase is used for a random contention access of an ordinary service, the MAP1 phase can reduce time delay and save electrical energy using the access mode of scheduling. Considered the situation that the data packet transmission failure might occur in the MAP1 phase, the central device arranges the remaining time slot allocation and specifies the permission of time slots of the MAP2 phase by the performance estimation in the Beacon2 to compensate for the MAP1 phase in time in the MAP2 phase, which can timely transmit the above data packets of a failed transmission, reduce time delay and improve reliability at the same time. Moreover, the final CAP phase allows a new node device to apply for joining and the node device temporarily not working in the network to apply for sleeping, which can further save energy consumption and facilitate the network extension or reduction.

BRIEF DESCRIPTION OF THE DRAWINGS

FIG. 1 is a schematic diagram of a super-frame structure based on a Beacon mode in the IEEE 802.15.6 of the related art;

FIG. 2 is a schematic diagram of a flow of an acquisition method for data in a wireless body area network according to a first embodiment of the present document;

FIG. 3 is a schematic diagram of a super-frame structure based on a Beacon mode according to an embodiment of the present document;

Figure 4:
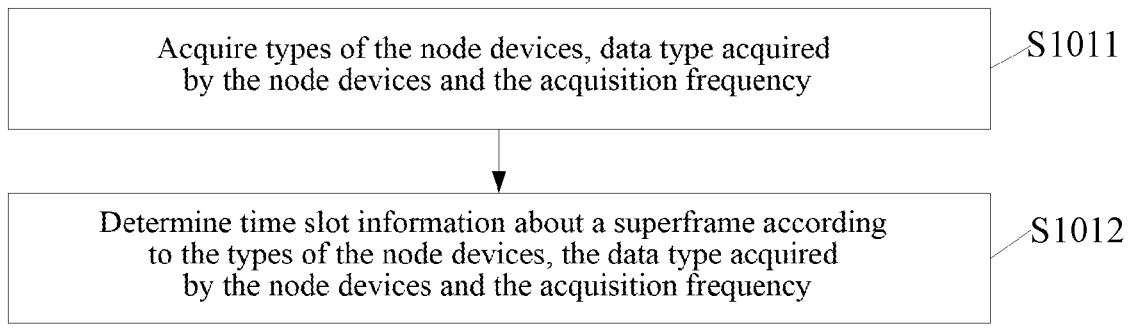
FIG. 4 is a schematic diagram of a detailed flow of the step 101 shown in FIG. 2.

The realization of the purpose of the present document, the features of functions and advantages will be further described with reference to drawings and in combination with the embodiments.

Preferred Embodiments

It should be understood that the specific embodiments described herein are merely used to explain the present document, but not used for limiting the present document.

An embodiment of the present document provides an acquisition method for data in a wireless body area network, and with reference to FIG. 2, in one embodiment, the acquisition method includes:

in step S101, a central device acquires topology structure information of a network formed by node devices, and according to the topology structure information of the network, determines time slot information about a super-frame that corresponds to the topology structure information of the network, and allocates the node device to which each time slot of the MAP1 phase belongs;

In the present embodiment, the central device may be a Hub, and the node device includes many types of sensors, such as an electrocardiogram sensor, a heart rate sensor, a blood pressure sensor or a temperature sensor, etc.

A wireless body area network is formed by a hub, an electrocardiogram sensor, a heart rate sensor, a blood pressure sensor or a temperature sensor, etc. In a network topology structure of a the wireless body area network which is formed by a hub, an electrocardiogram sensor, a heart rate sensor, a blood pressure sensor or a temperature sensor, etc, the hub initiates a request to sensor nodes and receives the topology structure information of the network sent by the sensor nodes. Therefore, to complete the establishment of a network connection is completed, then after that the hub receives data packets sent by the sensor nodes and sends to a personal mobile terminal, an external gateway or a remote monitoring center.

Alternatively, the topology structure information of the network includes types of node devices, data type acquired by the node devices and acquisition frequency, etc.

After acquiring the topology structure information of the network, the central device may determine time slot information of the super-frame according to the topology structure information of the network. Alternatively, the time slot information includes information about the time-slot length and so on.

In the present embodiment, as shown in FIG. 3, the structural design for the superframe includes: the superframe begins with a first Beacon and includes an EAP phase, a RAP phase, an MAP1 phase, a second Beacon2, an MAP2 phase and a CAP phase in sequence.

In the present embodiment, only the node device to which each time slot of the MAP1 phase belongs is allocated because the time slots of the EAP phase and the RAP phase are not managed, but obtained through the competition by the nodes.

In step S102, after broadcasting the time slot information to each node device, the central device acquires service data packets of an Exclusive Access Phase called EAP, a Random Access Phase called RAP and a managed access MAP1 phase in sequence;

The Beacon is often used to synchronize the attached device, and identify a body area network or describe a super-frame structure. Any device that wants to communicate during a Contention Access Phase called CAP of one superframe must use a slotted Carrier Sense Multiple Access with Collision Avoidance, called CSMA/CA mechanism. All the data transmissions must be completed before the arrival of the next Beacon.

Alternatively, the time slot information is broadcast by the Beacon in order to notify each node device of time slot information.

Herein, the central device receives emergency service data packets by using the CSMA/CA access mode in the EAP phase;

the central device receives ordinary service data packets by using the CSMA/CA access mode in the RAP phase.

In the MAP1 phase the type of service data is not distinguished, and the central device may receive ordinary/emergency service data packets by the way of "Scheduling": since the central device is able to know the type of a node device, the data type acquired by the node device and the acquisition frequency, the central device can implement the allocation of a certain number of effective time slots for each node device according to the type of the node device, the data type acquired by the node device and the acquisition frequency.

In the present embodiment, the MAP1 phase adopts the way of scheduling. Compared to the access mode of scheduling and polling used in the related art, the time delay caused by the interaction between the central device and the node device is greatly reduced. The low delay access channel for the node device and higher communication efficiency are achieved. The additional energy consumption caused by the use of the polling mode can be avoided, thus the electrical energy of the node device is saved.

In step S103, the central device determines the packet loss information of each node device in the MAP1 phase, and allocates time slots of an MAP2 phase to all the node devices in which packet loss occurs in the MAP1 phase according to the packet loss information;

in the present embodiment, the MAP1 phase adopts the way of "Scheduling", although the conflicts can be avoided, the central device cannot necessarily receive all of service data packets due to channel variations such as the cases of human motion or in the presence of background noise. After the MAP1 phase ends, the central device estimates the data transmission of the MAP1 phase, and in particular referring to acquiring the packet loss information of the MAP1 phase. Since the time slot information includes the node device to which each time slot belongs, after the central device determines the time slot information of the super-frame (which means that the central device has allocated a certain number of effective time slots to each node device), the central device may get the packet loss situation of the MAP1 phase by the allocated time slot and the data packets that are actually received by the central device, and the central device may know in which node devices packet loss occurs correspondingly, allocates the time slots of the MAP2 phase according to the packet loss information to prepare that the MAP2 phase will compensate for the MAP1 phase.

Alternatively, the central device broadcasts the time slots of the MAP2 phase to the node devices by the Beacon2 in order to notify the node devices in which packet loss occurs in the MAP1 phase of the time slots of the MAP2 phase.

In step S104, the node devices in which packet loss occurs in the MAP1 phase transmit emergency/ordinary service packets in the MAP2 phase, and the central device acquires the service data packets in the MAP2 phase.

In the above step S103, the central device publishes the time slots that have been allocated for the MAP2 phase by Beacon2 broadcasting, to notify the node devices in which packet loss occurs in the MAP1 phase of the time slots. The node devices in which packet loss occurs in the MAP1 phase transmit emergency/ordinary service packets in the MAP2 phase according to the usage right of the time slots broadcast by the Beacon2.

Compared with the IEEE 802.15.6 in the related art, the Beacon2 of the present embodiment contains more meanings. In the MAP2 phase, the central device allocates the available time slots to the node devices which do not effectively send data packets in the MAP1 phase and publishes the MAP2 time slot allocation scheme by the Beacon2, or referred to as broadcasting. Such a central device can manage network in a high efficiency.

In the present embodiment, after the MAP1 phase ends, the central device is required to estimate the data packet loss situation of the MAP1 phase and perform a compensation in the MAP2 phase, i.e., the MAP1 phase is supplemented by the MAP2 phase, the node devices where the transmission has failed in MAP1 phase due to network link quality are compensated, which makes service data packets transmit in time and reduces time delay, and can improve reliability of service data packet transmission for the node devices and ensure that the central device can basically receive all the data.

In an alternative embodiment, as shown in FIG. 4, on the basis of the embodiment of FIG. 3, in the above step S101, the steps of the central device acquiring topology structure information of a network formed by node devices, determining time slot information about a superframe according to the topology structure information of the network include:

in step S1011, the central device acquires types of the node devices, data type acquired by the node devices and acquisition frequency;

in step S1012, the central device determines time slot information of the superframe and allocates the node device to which each time slot of an MAP1 phase belongs according to the types of the node devices, the data type acquired by the node devices and the acquisition frequency.

Herein, the information about the topology structure of the network of the node devices acquired by the central device includes the types of the node devices, the data type acquired by the node devices and the acquisition frequency, etc. After acquiring the topology structure information of the network, the central device may determine time slot information of a superframe according to the topology structure information of the network. The time slot information includes information about the time-slot length and so on.

Alternatively, in the above step S1012, the step of determining time slot information of a superframe according to the types of the node devices, the data type acquired by the node devices and the acquisition frequency includes: the central device determines an overall time-slot length of the superframe, a time-slot length of the EAP phase, a time-slot length of the RAP phase and a time-slot length of the MAP1 phase according to the types of the node devices, the data type acquired by the node devices and the acquisition frequency.

Figure 5:
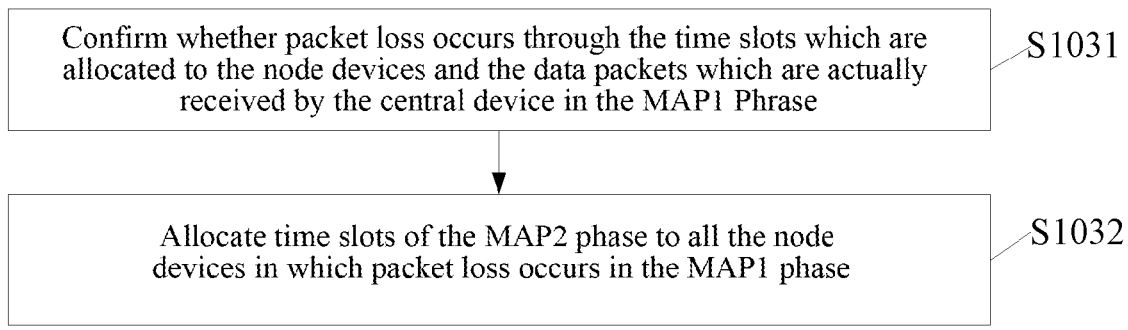
FIG. 5 is a schematic diagram of a detailed flow of the step 103 shown in FIG. 2.

In an alternative embodiment, as shown in FIG. 5, on the basis of the embodiment of FIG. 3, the above step S103 includes:

In step S1031, the central device confirms whether the packet loss occurs through the time slots which are allocated to the node devices and the data packets of the node device which are actually received by the central device in the MAP1 phase.

In step S1032, the central device executes step S1031 in all of node devices, and determines all the node devices in which packet loss occurs in the MAP1 phase, and allocates time slots of an MAP2 phase to all the node devices in which packet loss occurs in the MAP1 phase.

After the MAP1 phase ends, the central device estimates the data transmission of the MAP1 phase, in particular referring to acquiring the packet loss information of the MAP1 phase. Since the central device has allocated a certain number of effective time slots to each node device, and may get packet loss information of the MAP1 phase through the allocated time slots and the data packets that are actually received by the central device. For example, if it is to specify that n time slots receive one data packet and the MAP1 phase has m time slots in total, then the central device should receive (m/n) data packets in the MAP1 phase, compared the (m/n) data packets with the actually received data packets, the central device may know whether packet loss occurs and in which node devices packet loss occurs correspondingly, and allocates the time slots of the MAP2 phase according to the packet loss information to prepare that the MAP2 phase compensates for the MAP1 phase.

Figure 6:
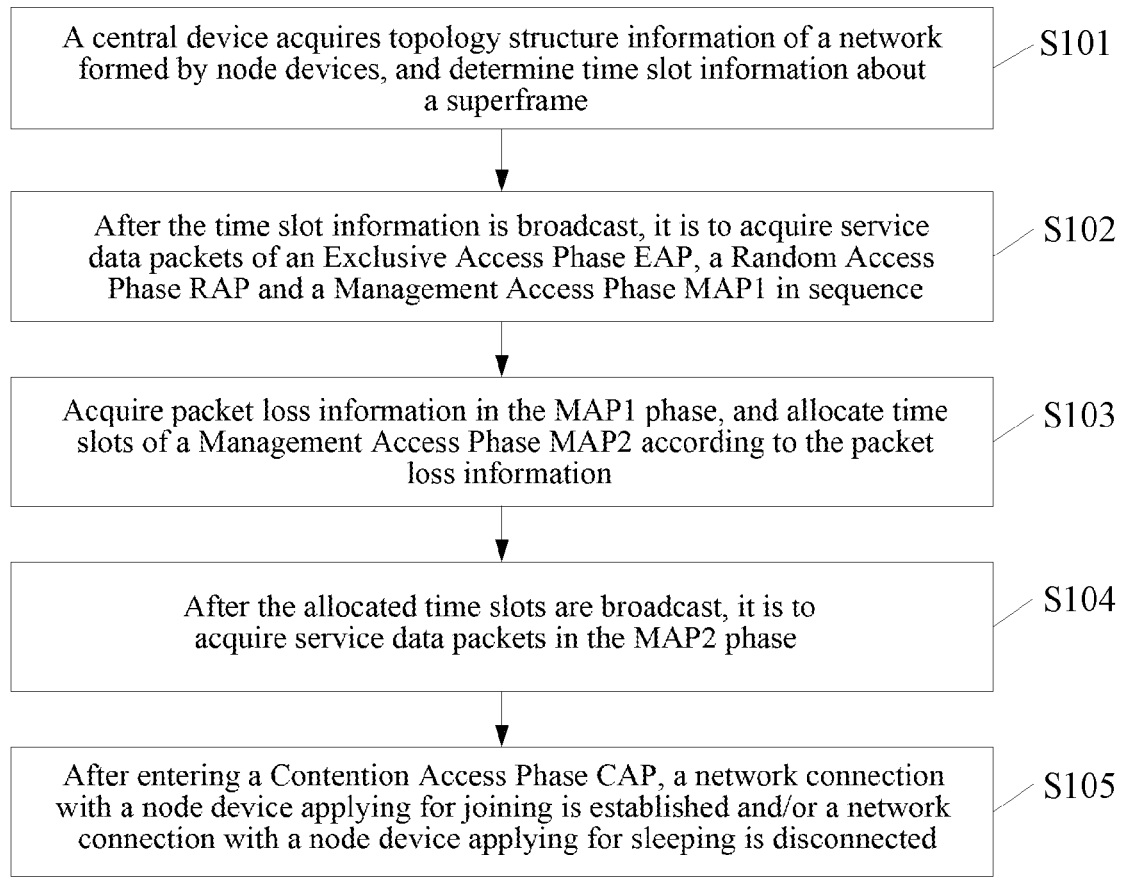
FIG. 6 is a schematic diagram of a flow of an acquisition method for data in a wireless body area network according to a second embodiment of the present document.

In an alternative embodiment, as shown in FIG. 6, on the basis of the embodiment of FIG. 3, the method further includes:

in step S105, after entering a Contention Access Phase called CAP, the central device establishes a network connection with a node device applying for joining and/or disconnects a network connection with a node device applying for sleeping.

In the final CAP phase, the central device allows to transmit emergency service/ordinary service data packets by using the CSMA/CA mechanism.

In addition, in the CAP phase, a new node device may apply for accessing the network and the node device that has accessed the network may apply for sleeping. When some node devices in the network are not required temporarily to work, they may apply for sleeping to the central device in the CAP phase, after obtaining the response of the central device, the node device may close the communication module and enter the sleep mode, thus further saving energy consumption. The central device may also determine the time slot allocation of next superframe according to a new network topology structure.

Figure 7:
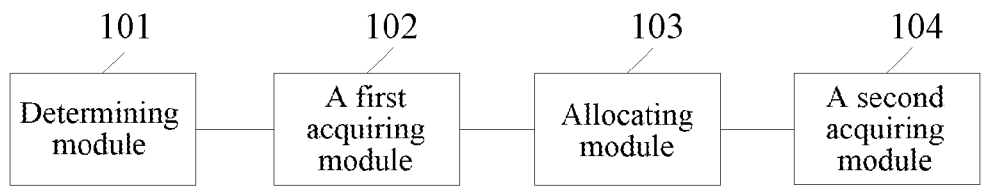
FIG. 7 is a schematic diagram of a central device structure for data in a wireless body area network according to a first embodiment of the present document.

An embodiment of the present document further provides a central device for data in a wireless body area network, as shown in FIG. 7, the central device includes: at least one execution determining module 101, a first acquiring module 102, an allocating module 103 and a processor of a second acquiring module 104, herein:

the determining module 101 is configured to acquire topology structure information of a network formed by node devices, and according to the topology structure information of the network, determine time slot information about a superframe that corresponds to the topology structure information of the network and allocate the node device to which each time slot of the MAP1 phase belongs;

in the present embodiment, the central device may be a Hub, and the node device includes many types of sensors, such as an electrocardiogram sensor, a heart rate sensor, a blood pressure sensor or temperature sensor, etc.

In a network topology structure of a wireless body area network which is formed by a hub, an electrocardiogram sensor, a heart rate sensor, a blood pressure sensor or temperature sensor, etc, the hub initiates a request to sensor nodes and receives the topology structure information of the network sent by the sensor nodes to complete the establishment of a network connection, and the hub receives data packets sent by the sensor nodes and sends to a personal mobile terminal, an external gateway or remote monitoring center.

Herein, the topology structure information of the network includes types of the node devices, the data type acquired by the node devices and the acquisition frequency, etc. After acquiring the topology structure information of the network, the central device may determine time slot information of a superframe according to the topology structure information of the network. The time slot information includes information about the time-slot length and so on. The structural design for a superframe in the present embodiment can refer to FIG. 3.

The first acquiring module 102 is configured to acquire service data packets of an Exclusive Access Phase called EAP, a Random Access Phase called RAP and a managed access MAP1 phase in sequence after the time slot information is broadcast.

The Beacon is often used to synchronize the attached device, and identify a body area network or describe a super-frame structure. Any device that wants to communicate in a contention access called CAP phase of one superframe must use a slotted Carrier Sense Multiple Access with Collision Avoidance, called CSMA/CA mechanism. All the data transmissions must be completed before the arrival of the next Beacon.

In the present embodiment, the time slot information is published by the Beacon broadcasting to notify each node device.

Herein, the central device receives emergency service data packets by using the CSMA/CA access mode in the EAP phase;

The central device receives ordinary service data packets by using the CSMA/CA access mode in the RAP phase;

In the MAP1 phase the type of service data is not distinguished, the central device may receive ordinary/emergency service data packets by using the way of "Scheduling": since the central device is able to know the types of node devices, the data type acquired by the node devices and the acquisition frequency, the central device can implement the allocation of a certain number of effective time slots to each node device according to the types of the node devices, the data type acquired by the node devices and the acquisition frequency.

In the present embodiment, the MAP1 phase adopts the way of scheduling, compared to the access modes of scheduling and polling used in the related art, the time delay caused by the interaction between the central device and the node device are greatly reduced and the low delay access channel for the node device and higher communication efficiency are achieved, and the additional energy consumption caused by the use of the polling mode can be avoided, thus the electrical energy of the node device is saved.

The allocating module 103 is configured to acquire packet loss information of each node device in the MAP1 phase, and allocate time slots of an MAP2 phase to all the node devices in which packet loss occurs in the MAP1 phase according to the packet loss information.

In the present embodiment, the MAP1 phase adopts the way of "Scheduling", although the conflicts can be avoided, the central device cannot necessarily receive all of service data packets due to channel variations such as the cases of human motion or in the presence of background noise. After the MAP1 phase ends, the central device estimates the data transmission of the MAP1 phase, in particular referring to acquiring the packet loss information of the MAP1 phase. Since the central device has allocated a certain number of effective time slots to each node device, the central device may get the packet loss situation of the MAP1 phase by the allocated time slots and the data packets that are actually received by the central device, and the central device may know in which node devices packet loss occurs correspondingly in, and allocates the time slots of the MAP2 phase according to the packet loss information to prepare that the MAP2 phase compensates for the MAP1 phase.

The second acquiring module 104 is configured to acquire service data packets in the MAP2 phase after the allocated time slots are broadcast.

In the present embodiment, the time slots that have been allocated for the MAP2 phase are published by a Beacon2 broadcasting to notify the node devices in which packet loss occurs in the MAP1 phase. The node devices in which packet loss occurs in the MAP1 phase transmit emergency/ordinary service packets in this phase according to the usage right of the time slots published by the Beacon2.

Compared with the IEEE 802.15.6 in the related art, the Beacon2 of the present embodiment contains more meanings. In the MAP2 phase, the central device allocates the available time slots to the node devices which do not effectively send data packets in the MAP1 phase and publishes the time slot allocation scheme in the MAP2 by the Beacon2. Such a central device can manage network in a high efficiency.

In the present embodiment, after the MAP1 phase ends, the central device is required to estimate the data packet loss situation of the MAP1 phase and perform a compensation in the MAP2 phase, i.e., the MAP1 phase is supplemented by the MAP2 phase, the node devices where the transmission has failed during the MAP1 due to the network link quality are compensated, which makes service data packets transmit in time and reduces time delay, and can improve reliability of service data packet transmission for the node devices and ensure that the central device can basically receive all the data.

Alternatively, the first acquiring module 102 is configured to broadcast the time slot information by a first Beacon in order to notify each node device of the time slot information.

Alternatively, the second acquiring module 104 is configured to broadcast the time slots of the MAP2 phase to node devices by a second Beacon2 in order to notify the node devices in which packet loss occurs in the MAP1 phase of the time slots of the MAP2 phase.

Alternatively, the first acquiring module 102 is configured to receive emergency service data packets by using Carrier Sense Multiple Access with Collision Avoidance, called CSMA/CA access mode in the EAP phase, and receive ordinary service data packets by using the CSMA/CA access mode in the RAP phase, and receive emergency and/or ordinary service data packets by using Scheduling mode in the MAP1 phase.

The second acquiring module 104 is configured to receive emergency and/or ordinary service data packets by using Scheduling mode in the MAP2 phase.

Alternatively, the second acquiring module 104 is further configured to acquire service data packets in a Contention Access Phase called CAP after acquiring service data packets in the MAP2 phase.

Alternatively, the second acquiring module 104 is configured to receive emergency and/or ordinary service data packets by using Carrier Sense Multiple Access with Collision Avoidance, called CSMA/CA access mode in the CAP phase.

Figure 8:
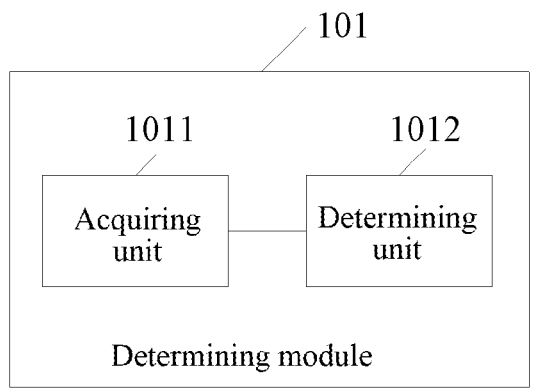
FIG. 8 is a schematic diagram of a structure for the determining module shown in FIG. 7.

In an alternative embodiment, as shown in FIG. 8, on the basis of the embodiment of FIG. 7, the above determining module 101 includes an acquiring unit 1011 and a determining unit 1012, herein:

the acquiring unit 1011 is configured to acquire types of the node devices, data type acquired by the node devices and the acquisition frequency;

the determining unit 1012 is configured to determine time slot information of the superframe according to the types of the node devices, the data type acquired by the node devices and the acquisition frequency, and allocate the node device to which each time slot of the MAP1 phase belongs.

Herein, the topology structure information of a network of the node device acquired by the acquiring unit 1011 includes: types of the node devices, data type acquired by the node devices and acquisition frequency, etc. After acquiring the topology structure information of the network, the central device may determine time slot information of a superframe according to the topology structure information of the network. The time slot information includes information about the time-slot length and so on.

Alternatively, the above determining unit 1012 is particularly configured to determine an overall time-slot length of the superframe, a time-slot length of the EAP phase, a time-slot length of the RAP phase and a time-slot length of the MAP1 phase according to the types of the node devices, the data type acquired by the node devices and the acquisition frequency, and allocate the node device to which each time slot of the MAP1 phase belongs.

Figure 9:
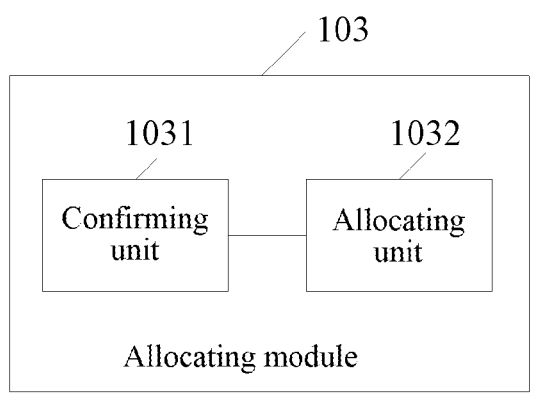
FIG. 9 is a schematic diagram of a structure for the allocating module shown in FIG. 7.

In an alternative embodiment, as shown in FIG. 9, on the basis of the embodiment of FIG. 7, the allocating module 103 includes a confirming unit 1031 and an allocating unit 1032, herein:

the confirming unit 1031 is configured to confirm whether packet loss occurs through the time slot which is allocated to each node device in the MAP1 phase and the data packets which are actually received by the central device;

the allocating unit 1032 is configured to allocate time slots of the MAP2 phase to all the node devices in which the packet loss occurs in the MAP1 phase.

After the MAP1 phase ends, the central device estimates the data transmission of the MAP1 phase, in particular referring to acquiring the packet loss information of the MAP1 phase. Since the central device has allocated a certain number of effective time slots to each node device, and may get packet loss information of the MAP1 phase through the allocated time slots and the data packets that are actually received by the central device. For example, it is to specify that n time slots receive one data packet and the MAP1 phase has m time slots in total, then the central device should receive (m/n) data packets in the MAP1 phase, and compared the (m/n) data packets with the actually received data packets, the central device may know whether packet loss occurs and in which node devices packet loss occurs correspondingly, and allocates the time slots of the MAP2 phase according to the packet loss information to prepare that the MAP2 phase compensates for the MAP1 phase.

Figure 10:
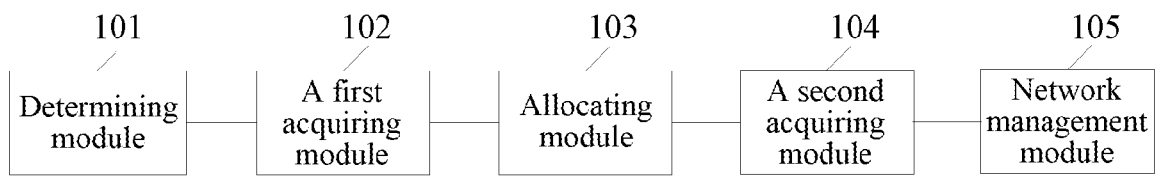
FIG. 10 is a schematic diagram of a central device structure for data in a wireless body area network according to a second embodiment of the present document.

In an alternative embodiment, as shown in FIG. 10, on the basis of the embodiment of FIG. 7, the central device further includes a network management module 105, the network management module 105 is configured to establish a network connection with a node device applying for joining and/or disconnect a network connection with a node device applying for sleeping after entering a Contention access Phase called CAP.

In the final CAP phase, the central device allows to transmit emergency service/ordinary service data packets by using the CSMA/CA mechanism.

In addition, in the CAP phase, a new node device may apply for accessing the network and the node device that has accessed the network may apply for sleeping, which facilitates the network extension or reduction. When some node devices in the network are not required temporarily to work, they may apply for sleeping to the central device in the CAP phase, after obtaining the response of the central device, the node device may close the communication module and enter the sleep mode, thus further saving energy consumption. The central device may also determine the time slot allocation of next superframe according to a new network topology structure.

The serial number of the above embodiments is only for description and does not indicate advantages and disadvantages of the embodiments. From the above description of the embodiments, it is apparent to those skilled in the art that the method of the above embodiments may be implemented by the way of software and necessary universal hardware platform, certainly also by the hardware, but in many cases, the former is the preferred embodiment. Based on such a understanding, the technical solution of the present document in nature, or in other words, the part thereof that makes contribution to the related art, can be embodied in the form of software product, this computer software product is stored in a storage medium (e.g., ROM/RAM, magnetic disk, optical disk), and includes instructions which enable a terminal device (may be a mobile phone, a computer, a server or network appliance, etc) to implement the method described in various embodiments of the present document.

The above is only preferred embodiments of the present document and does not limit the patent scope of the present document, and any equivalent structures or equivalent flow variations made by using the specification and accompanying drawings of the present document, which applied directly or indirectly in other relevant technical fields, are included in the scope of patent protection of the present document.

INDUSTRIAL APPLICABILITY

In the acquisition method for data in a wireless body area network and a central device of the above technical solution, in the process that the central device receives service data packets, a superframe begins with a Beacon and is composed of an EAP phase, a RAP phase, an MAP1 phase, a Beacon2, an MAP2 phase and a CAP phase. Herein, the EAP phase is used for a random contention access of an emergency service, the RAP phase is used for a random contention access of an ordinary service, the MAP1 phase uses the access mode of scheduling, which can reduce time delay and save electrical energy. Considered the situation that the data packet transmission failure might occur in the MAP1 phase, the central device arranges the remaining time slot allocation and specifies the permission of time slots of the MAP2 phase by the performance estimation in the Beacon2, to compensate for the MAP1 phase in time in the MAP2 phase, which can timely transmit the above data packets of a failed transmission, reduce time delay and improve reliability at the same time. Moreover, the final CAP phase allows a new node device to apply for joining and the node device temporarily not working in the network to apply for sleeping, which can further save energy consumption and facilitate the network extension or reduction. Therefore, the invention has a strong industrial applicability.

What is claimed is:

1. An acquisition method for data in a wireless body area network, comprising:
   a central device acquiring topology structure information of a network formed by node devices, and according to the topology structure information of the network, determining time slot information about a super-frame that corresponds to the topology structure information of the network and allocating the node device to which each time slot of a first Managed Access Phase called MAP1 belongs;
   after broadcasting the time slot information, the central device acquiring service data packets of an Exclusive Access Phase called EAP, a Random Access Phase called RAP and the MAP1 phase in sequence;
   the central device acquiring packet loss information of each node device in the MAP1 phase, and allocating time slots of a second Managed Access Phase called MAP2 to all the node devices in which packets were lost in the MAP1 phase according to the packet loss information;
   after broadcasting the allocated time slots of the MAP2 phase, the central device acquiring service data packets in the MAP2 phase; wherein the steps of a central device acquiring topology structure information of a network formed by node devices, and according to the topology structure information of the network, determining time slot information about a super-frame that corresponds to the topology structure information of the network comprise:
   acquiring types of the node devices, data type acquired by the node devices and an acquisition frequency;
   determining the time slot information of the super-frame according to the types of the node devices, the data type acquired by the node device and the acquisition frequency; wherein the step of determining the time slot information of the super-frame according to the types of the node devices, the data type acquired by the node devices and the acquisition frequency comprises:
   determining an overall time-slot length of the super-frame, a time-slot length of the EAP phase, a time-slot length of the RAP phase and a time-slot length of the MAP1 phase according to the types of the node devices, the data type acquired by the node devices and the acquisition frequency.

2. The acquisition method according to claim 1, wherein the steps of acquiring packet loss information in the MAP1 phase, and allocating time slots of the MAP2 phase according to the packet loss information comprise:
   confirming whether packet loss occurs in each node device through the time slot which is allocated to each node device and the data packets which are actually received by the central device in the MAP1 phase;
   allocating time slots of the MAP2 phase to all the node devices in which the packet loss occurs in the MAP1 phase.

3. The acquisition method according to claim 1, the method further comprising:
   after entering a Contention Access Phase called CAP, the central device establishing a network connection with a node device applying for joining and/or disconnecting a network connection with a node device applying for sleeping.

4. The acquisition method according to claim 1, wherein, in the step of the central device broadcasting the time slot information, the central device broadcasts the time slot information by a first Beacon in order to notify each node device of the time slot information.

5. The acquisition method according to claim 1, wherein, in the step of the central device broadcasting the allocated time slots of the MAP2 phase, the central device broadcasts the time slots of the MAP2 phase to the node devices by a second Beacon2 in order to notify the node devices in which packet loss occurs in the MAP1 phase of the time slots of the MAP2 phase.

6. The acquisition method according to claim 1, wherein, the central device receives emergency service data packets by using Carrier Sense Multiple Access with Collision Avoidance, called CSMA/CA access mode in the EAP phase, and receives ordinary service data packets by using the CSMA/CA access mode in the RAP phase, and receives emergency and/or ordinary service data packets by using Scheduling mode in the MAP1 phase and the MAP2 phase.

7. The acquisition method according to claim 1, the method further comprising:
after the central device acquiring service data packets in the MAP2 phase, acquiring service data packets in a Contention Access Phase called CAP.

8. The acquisition method according to claim 7, wherein, said acquiring service data packets in a Contention Access Phase called CAP comprises:
receiving emergency and/or ordinary service data packets by using Carrier Sense Multiple Access with Collision Avoidance, called CSMA/CA access mode in the CAP phase.

9. A central device for data in a wireless body area network, comprising hardware performing instructions stored in a non-transitory computer readable medium which executes steps in following modules: a determining module, a first acquiring module, an allocating module and a second acquiring module, wherein:
the determining module is configured to acquire topology structure information of a network formed by node devices, and according to the topology structure information of the network, determine time slot information about a super-frame and allocate the node device to which each time slot of an MAP1 phase belongs;
the first acquiring module is configured to acquire service data packets of an Exclusive Access Phase called EAP, a Random Access Phase called RAP and a first Managed Access Phase called MAP1 in sequence after the time slot information is broadcast;
the allocating module is configured to acquire packet loss information of each node device in the MAP1 phase, and allocate time slots of a second Managed Access Phase called MAP2 to all the node devices in which packets were lost in the MAP1 phase;
the second acquiring module is configured to acquire service data packets in the MAP2 phase after the allocated time slots of the MAP2 phase are broadcast; wherein the determining module further includes hardware performing instructions stored in a non-transitory computer readable medium which executes steps in following units: an acquiring unit and a determining unit, wherein:
the acquiring unit is configured to acquire types of the node devices, data type acquired by the node devices and an acquisition frequency;
the determining unit is configured to determine the time slot information of the super-frame according to the types of the node devices, the data type acquired by the node devices and the acquisition frequency; wherein the determining unit is configured to determine the time slot information of the super-frame according to the types of the node devices, the data type acquired by the node devices and the acquisition frequency according to the following:
determining an overall time-slot length of the super-frame, a time-slot length of the EAP phase, a time-slot length of the RAP phase and a time-slot length of the MAP1 phase according to the types of the node devices, the data type acquired by the node devices and the acquisition frequency.

10. The central device according to claim 9, wherein the allocating module includes: a confirming unit and an allocating unit, wherein:
the confirming unit is configured to confirm whether packet loss occurs in each node device through the time slot which is allocated to each node device and the data packets which are actually received by the central device in the MAP1 phase;
the allocating unit is configured to allocate time slots of the MAP2 phase to all the node devices in which the packets were lost in the MAP1 phase.

11. The central device according to claim 9, the central device further comprises a network management module, wherein:
the network management module is configured to establish a network connection with a node device applying for joining and/or disconnect a network connection with a node device applying for sleeping after entering a Contention Access Phase called CAP.

12. The central device according to claim 9, wherein, the first acquiring module is configured to broadcast the time slot information by a first Beacon in order to notify each node device of the time slot information.

13. The central device according to claim 9, wherein, the second acquiring module is configured to broadcast the time slots of the MAP2 phase to node devices by a second Beacon2 in order to notify the node devices in which packet loss occurs in the MAP1 phase of the time slots of the MAP2 phase.

14. The central device according to claim 9, wherein, the first acquiring module is configured to receive emergency service data packets by using Carrier Sense Multiple Access with Collision Avoidance, called CSMA/CA access mode in the EAP phase, and receive ordinary service data packets by using the CSMA/CA access mode in the RAP phase, and receive emergency and/or ordinary service data packets by using Scheduling mode in the MAP1 phase
the second acquiring module is configured to receive emergency and/or ordinary service data packets by using Scheduling mode in the MAP2 phase.

15. The central device according to claim 9, wherein, the second acquiring module is further configured to acquire service data packets in a Contention Access Phase called CAP after acquiring service data packets in the MAP2 phase.

16. The central device according to claim 9, wherein, the second acquiring module is configured to receive emergency and/or ordinary service data packets by using Carrier Sense Multiple Access with Collision Avoidance, called CSMA/CA access mode in the CAP phase.

* * * * *